May 19, 1970
R. F. HALL
3,512,722
METHOD OF PRODUCING A FINELY DIVIDED
SUBSTANCE AND APPARATUS THEREFOR
Filed Oct. 3, 1967
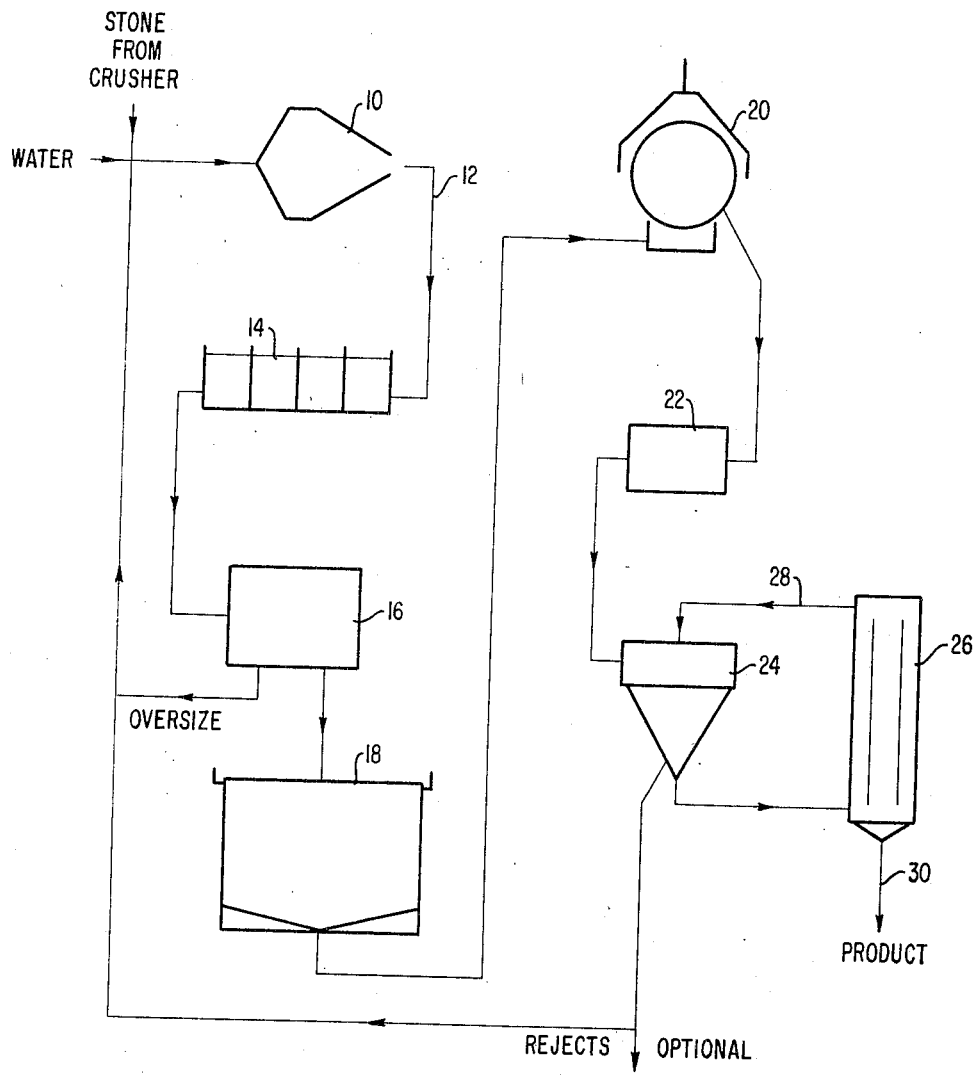
INVENTOR
ROBERT F. HALL
BY Browne, Schuyler & Beveridge
ATTORNEY United States Patent Office 3,512,722
Patented May 19, 1970

3,512,722
METHOD OF PRODUCING A FINELY DIVIDED SUBSTANCE AND APPARATUS THEREFOR
Robert F. Hall, Tate, Ga., assignor to The Georgia Marble Company, Tate, Ga., a corporation of Georgia
Filed Oct. 3, 1967, Ser. No. 672,638
Int. Cl. B02c 9/04
U.S. Cl. 241—24          3 Claims

ABSTRACT OF THE DISCLOSURE

A method for producing finely divided filler, particularly calcium carbonate extender pigment, wherein the crushed rock is subjected to a wet grinding operation and after being subsequently dried and pulverized, is then suspended in an air stream and classified according to a selected particle size. The oversize particles are separated from the air stream to obtain a product that is relatively free of agglomerates and which has improved brightness and reflectance.

---

The present invention relates to a method of producing finely divided sharply classified rock substances and apparatus therefor. More particularly, the present invention pertains to the method of manufacturing a finely ground naturally occurring calcium carbonate which is sharply classified and characterized by being essentially free of agglomerates and other oversized particles and which possess improved brightness or increased reflectance.

In the past, natural calcium carbonate has been used as a filler and extender pigment and has been employed in formulating and compounding many different types of materials. For example, these filler and extender pigments have been employed with considerable success in such diverse industry as the paint, plastic, rubber, vinyl tile, coated fabric, mastic caulking, tile grout, rug-backing and paper filling and coating industries.

Natural ground calcium carbonate extender pigments have been produced in the past by the general method which has been called the wet process. The sequence of operations comprises the following steps: Quarrying, crushing, wet grinding, beneficiation, classification, partial de-watering, drying and pulverizing. This method is capable of producing a product, the mean particle diameter of which occurs in the range from about 1.0 to 7.0 microns. However, the wet process has certain inherent characteristics which result in the products having properties which are somewhat less than optimum.

The wet process by its very nature is prone to produce agglomerates or oversized particles which tendency becomes greater as the extender mean particle diameter becomes smaller. The tendency to agglomerate is observed in the method of producing synthetic or precipitated calcium carbonate as well. Agglomerates are aggregates or collections of discrete primary mineral particles, calcium carbonate primarily, which are held together by attractive forces which are varying degrees of intensity. Since the forces holding the particles together vary in intensity the agglomerates resist to varying degrees subsequent disintegration or crushing. Thus, the agglomerates vary in hardness from very soft to very hard. In addition, the agglomerates vary in size and may be as large as 100 microns.

In addition to being able to produce a product which has a reduced tendency to form agglomerates, it is also advantageous to obtain a product which has improved brightness or reflectiveness. The latter property is extremely valuable in paper filling and coating technology where it is desirable to produce a paper having a uniform brightness and being free of dark or dull colored particles which would produce a dull or an unattractive finish. Similarly, when used for light colored paint or as filler for pastel colored plastics it is critical that there be no off-colored mineral particles in the extender material.

It is therefore an object of the present invention to provide a method for the manufacture of a finely divided substance which is substantially free of agglomerates and which possesses improved brightness or reflectance.

It is another object of the present invention to provide a method for the manufacture of finely divided naturally occurring calcium carbonate extender pigments which possess improved brightness or reflectance.

It is a further object of the present invention to provide an apparatus for carrying out the method of the present invention.

It is a further object of the present invention to provide a method for the manufacture of finely divided naturally occurring calcium carbonate extender pigment which is closely classified and contains a minimum of oversized particles.

In attaining the objects set forth above, one feature of the present invention resides in a method for producing a finely divided naturally occurring calcium carbonate which comprises quarrying the naturally occurring limestone rock which contains essentially calcium carbonate, crushing the naturally occurring rock to the desired degree and wet grinding the crushed rock to the desired degree of fineness. Thereafter, the colored and undesirable off-color particles are separated from the finely divided calcium carbonate by beneficiation, classifying the product according to a selected particle size, partially dewatering the product, drying and pulverizing the product. Subsequently, the pulverized product is air classified and separated into two fractions, one of the fractions consisting essentially of particles above a selected particle size and the other fraction consisting essentially of a product containing substantially all particle sizes below the selected particle size. Thereafter the fraction consisting essentially of the product containing substantially all particle sizes below said selected particle size is then sent to a product collector which removes the product from the air stream and recovers the desired, closely classified product.

In accordance with another feature of the present invention, there is provided an apparatus which comprises a grinding facility, a beneficiation or flotation means, a classifier, a drier, a pulverizer, an air classifier and a product collector.

The foregoing and other objects and features as well as advantages of the present invention will become apparent from the following detailed description thereof, taken in conjunction with the figure which shows a schematic flow diagram of the method and apparatus of the present invention.

In carrying out the invention and as illustrated in the accompanying drawing, the quarried limestone is crushed to a desired degree in any of the customary crushing equipment. The capacity of the crusher can vary depending on the quantity of crushed rock that must be handled in a given interval of time. As the crushing proceeds, the number of particles increases thereby requiring more contact per unit of mass. It will be seen, therefore, that the capacity of the particular machine of any given dimensions is less for smaller sizes than it is for larger sizes and hence it is necessary for smaller particles to remain in the machine for longer periods of time to sustain a required number of contacts.

After the rock is crushed to a desired size range, it is passed to a wet grinding faciilty 10 which can be any one of the conventional mills for this purpose such as a Hardinge Mill. Also suitable for this purpose are ball mills; i.e. horizontal rotating cylindrical or conical steel chambers which are generally filled half way with steel or iron balls or other hard substances. In the operation of the mill, the balls are lifted by the rotating chamber and fall back onto the crushed rock thereby further reducing the crushed rock to a fine size by impact. The size of these ball mills can vary and can be operated continuously, the feed entering at one end and discharging at the opposite end. The circulating fluid is generally water in which the smaller particles are suspended and conveyed through line 12 to the beneficiation or flotation stage, carried out in a suitable flotation cell 14 such as a Denver Float Cell.

In the flotation step, a froth or foam is produced by agitation and flotation chemicals and the off-color minerals are removed from the water slurry of the finely divided calmium carbonate. A higher quality product is produced having improved brightness or reflectance, as a result of the removal of the colored mineral particles. Any suitable flotation equipment can be used for this purpose, the usual type consisting of the vessel or tank provided with a feed at one end and an overflow for froth removal and a discharge for residual matter at the opposite end. Generally, this equipment is provided with a means for introducing air for the froth formation or agitation. The agitation can be provided by either compressed air in which case the cells are referred to as pneumatic cells or by mechanical agitators in which case the cells are referred to as mechanical cells. It is generally desirable to use a mechanical cell because of the more vigorous agitation that is obtainable by use of the impeller means.

After removal of undesirable and off-color materials from the finely divided calcium carbonate in the flotation or beneficiation step, the product moves to a classifier 16 which separates the finely divided calcium carbonate into two fractions according to a selected particle size. Oversized particles may be returned to the grinding facility 10. The other fraction which contains essentially all the particles smaller than the selected size can be treated in a thickener 18 for sedimentation. This functions to separate the suspension or slurry into a supernatant relatively clear water layer and a relatively dense slurry containing a higher concentration of the finely divided calcium carbonate. The supernatant water layer is then removed and the dense slurry is sent to a drier 20. By removing a large amount of the water in the supernatant liquid a considerably less load is placed on the driers for water removal. The driers can be of the conventional types such as a drum drier.

After drying, the product passes to the pulverizer 22 which breaks up any agglomerates and aggregations formed in the drier 20. The pulverized product is suspended in an airstream which is then conveyed to classifier 24 which selectively separates the finely divided calcium carbonate into fractions according to the selected particle size. The oversized particles may be either rejected or returned to the grinding facility 10 for reprocessing through the entire sequence of operations. The other fraction which contains particles under the selected particles size is conveyed in the air stream to the product collector 26 which separates the product from the air stream and recirculates the air stream through line 28. The product may be recovered through the discharge 30.

Percent reflectance of the calcium carbonate finely divided extender which is produced by the process of the present invention as measured on a Hunter Reflectometer, is reported in the table below. Values are to be interpreted as the percentage of light which, after passing through a specified filter, is reflected from the dry compacted sample. The percentages are based on the quantity of light reflected from a standard magnesium oxide under identical conditions of measurement. The fundamentals and applications of the Hunter Reflectometer are discussed in the following publications of the National Bureau of Standards: Richard S. Hunter, A Multi-Purpose Photoelectric Reflectometer; J. Research NBS, 25, 581 (1940) R.P. 1345; Richard S. Hunter, Photoelectric Tristimulus Colorimetry With Three Filters, Circular C429, NBS, July 30, 1942.

It will be noted that the table contains reflectance values of the product before as well as after it has been beneficiated. It should also be pointed out that the absolute values of the laboratory and plant results are not exactly comparable since the laboratory investigation was made using a pigment with mean particle sizes much smaller than that in the plant process. In the plant process the extender is classified after flotation. The reflectance increases considerably as the main particle diameter decreases. During flotation an increase in reflectance always occurs never less than 1% and sometimes as much as 3%. These increases in reflectance values are significant and of considerable importance in the art.

TABLE.—PERCENT REFLECTANCE OF CaCO₃ EXTENDERS BEFORE AND AFTER FLOTATION
[Basis: MgO=100]

|  | Laboratory flotation | | Plant flotation | |
| --- | --- | --- | --- | --- |
|  | Before | After | Before | After |
| Green filter | 98.5 | 100 | 93.8 | 96.6 |
| Blue filter | 98.9 | 100 | 92.2 | 95.3 |
| Green filter | 97.0 | 100 | 93.3 | 95.5 |
| Blue filter | 96.9 | 100 | 92.2 | 93.9 |

The following example serves to further illustrate the present invention:

Raw stone, 3 inches in diameter and smaller, is fed into 6 to 8 Hardinge Mills in parallel, a convenient size being 3 feet in diameter by 8 feet long. Water is added with the stone, either as fresh water or as recycled water to bring the slurry to 50 to 60 percent solids.

The throughput of the mills is adjustable and varies with the size of the raw stone as well as the fineness of the desired product. An average or normal rate of throughput would occur somewhere in the range around 0.4 to 0.5 ton per hour. In producing an extremely fine product the throughput is low while for a larger particle sized product, perhaps up to 6 microns average particle size, the throughput would be greater.

A maximum rate of raw stone addition which, of course, is equal to the rate of production of the final product, would be up to 3 tons per hour, requiring 6 to 8 mills in parallel.

The discharge from the mills before it is led to the flotation cells is diluted with fresh or recirculated water to 40 to 45 percent solids. This lower solids content aids in the flotataion as well as the classification steps.

The flotation cell, a Denver No. 18 Special, six cell Sub A machine is capable of handling up to about 4 tons per hour of new or raw stone. Prior to entering the flotation cell, the flotation chemicals, consisting of a promoter, a collector and a frother, are added to the slurry or pulp. Many flotation chemicals are available and may be used for purposes of the present invention as will be apparent to one skilled in the art. These, in combination with thorough agitation and aeration, produce a froth whose bubbles contain on their surfaces the off-color impurities consisting of such colored minerals as silica, silicates, mica, pyrite, graphite and others. The froth is removed as an overflow which is discarded.

Two classifiers are used which are 40 inch x 60 inch Bird continuous centrifuge machines each capable of separating up to 1½ tons per hour of classified product. The concentration of the product slurry depends on the fineness of its particles and may vary between about 10 to 15 percent solids.

The classifiers reject particles larger in size than that required by the machine settings. These rejects are returned or recycled in closed circuit to the Hardinge Mills for regrinding. The quantity of these rejects, the circulating load, is sizeable and may vary between 200 and 600 percent of the raw rock feed. That is, the total throughput through the mills and the flotation cell may vary between 9 and 21 tons per hour.

It is to be understood that the adjustments and settings on the Bird centrifuge make it possible to manufacture more than one product. That is, a typical fine product, 2.5 microns for an average particle size, would be separated by the centrifuge revolving at a specified speed, whereas a product of 6.0 microns would be separated at a somewhat lower speed. That is to say that at the lower speed of the centrifuge greater quantities of larger particles appear in the product and a corresponding lowered quantity needs to be returned to the mills for regrinding.

For example, a given product immediately exiting from the Bird classifier might have an average particle size of 5 microns. This infers that 50 percent of this product by weight is smaller than 5 microns and that 50 percent is larger than 5 microns. A certain percentage, although very small, would consist of larger particles up to perhaps 50 microns. Hence this product or fraction could be described as containing particles from 50 microns down to a few tenths of a micron, with a weight average at 5 microns.

Other settings of the Bird machine are possible which would produce similar distributions of particle sizes with an average particle size as low as, for example, 2 microns and as large as, for example, 6 microns. The large particles, roughly 45 to 55 microns become more numerous as the average particle size increases.

In a way, this wide distribution of particle sizes indicates that the classification taking place in the Bird centrifuge is somewhat less than sharp and points out the need of the greater precision furnished by adding to the wet circuit the Air Sifter and the Air Sifter Cyclone.

Product slurry from the centrifuges is pumped to a thickener where by natural settling the slurry is thickened to 55 to 60 percent solids. The relatively clear supernatant water is removed from the top of the thickener and returned to the system either as make-up water or as dilution water. The thickeners can be of almost any diameter, capacity and rate of throughput and are manufactured by the Dorr-Oliver Company among others in diameters from 25 feet up to 60 feet in some plants. The maximum rate consistent with this disclosure is optimum at about 3 tons per hour.

After thickening, the slurry is then pumped from the bottom of the thickener to a number of drum driers in parallel. These driers are manufactured by a number of producers among them being Blaw-Knox, Bufflovac Division, Drum Driers. In a general way, they are revolving steam heated drums, 4 feet in diameter by 10 feet long. The slurry is sprayed or splashed onto the heated drum and is dried as the drum revolves, the product being removed with a doctor blade before the drum returns to the spray position. The throughput of these driers varies with the fineness of the product, the capacity being less for the most finely ground. Inasmuch as the rate of throughput is in the range of about 0.4 ton per hours, 8 to 10 driers are required.

From the driers the product is conveyed to a Mikro-Pulverizer, Model 3TH, manufactured by the Pulverizing Machinery Co. and which is capable of handling up to 4 tons per hour. While functioning to break up agglomerates, the pulverizer does not reduce the size of the primary calcium carbonate particles. Its design is in effect that of a hammer mill, containing a retaining screen. The feed to the Mikro-Pulverizer remains in the chamber until the size of the particles is small enough to pass through the holes in the retaining screen. However, the hole diameter being 0.022 inch is much larger than practically all the agglomerates which range in size downward from approximately 0.004 inch (100 microns). Although the Mikro-Pulverizer does in fact remove considerable agglomerates by breaking them into smaller particles, some quantity of them remain. It is to remove these remaining agglomerates as well as the small quantity of oversized discrete particles (see above) that it is necessary further to treat the product to a second classification; e.g. the Air Sifter and the Air Sifter Cyclone.

The product from the Mikro-Pulverizer which contains all the fines below about 50 microns is conveyed to an Air Sifter manufactured by the Air Classifier Sales Corporation where the product is again separated into two fractions, one fraction containing substantially the oversize particles; e.g. larger than about 8 to 10 microns and the other fraction containing substantially all the fines below 8 to 10 microns. It is understood that the 8 to 10 micron cut off range is merely by means of illustration. In fact, the cut off range is itself adjustable by means of machine settings in order to produce an almost infinite variety of products each with its own sharply controlled cut off range.

The rate of feed to the Air Sifter is approximately equal to the rate of raw stone fed to the Hardinge Mills; namely up to 3 tons per hour. The oversize or rejects separated by the Air Sifter can be circulated in closed circuit with the Hardinge Mills for regrinding, or, can be removed as an optional product, or possible even discarded as having no value.

The finer product is then conveyed to an Air Sifter Cyclone where the main product is separated from the air stream and may be collected. The air is recycled through line 28.

The present invention is particularly important in connection with the paint and plastics industries where it is essential that the extenders have improved and uniform brightness or reflectance. In light or pastel colored plastics and in light colored paints extended with the calcium carbonate pigments it is of critical importance that no off-colored minerals be allowed to remain in the extender. Hence, following the teachings of the present invention overcomes the problems encountered by the paint and plastic industries with extender pigments containing trace amounts of gray, black, brown, amber, green or red minerals which interfere seriously with the desired final colors of the manufactured product.

What is claimed is:

1. A method for producing a finely divided calcium carbonate mineral which is characterized by brightness and reflectance and being relatively free of agglomerates which comprises grinding the calcium carbonate naturally occurring rock to a desired degree, forming an aqueous slurry of the ground calcium carbonate, and subjecting said slurry to flotation so as to create a froth and remove the unwanted off-colored mineral particles therefrom, classifying the product according to a selected particle size whereby the oversized particles are returned for further grinding and the particles of the selected particle size are permitted to settle to obtain a concentrated slurry, removing the supernatant aqueous layer, drying the concentrated slurry to remove a substantial amount of water therefrom, thereafter pulverizing the dried product to reduce the amount of agglomerates and large particles, suspending the pulverized finely divided calcium carbonate in an air stream and selectively separating said calcium carbonate suspended in the air stream into two fractions according to a selected particle size, the oversize fraction being removed, and the product of said classification being of an average particle size corresponding essentially to the selected particle size and separating said product from the air stream and collecting said product.

2. The method as defined in claim 1 wherein the oversize fraction obtained from the air classifier is recycled for further grinding.

3. Apparatus for obtaining a finely divided calcium carbonate extender pigment comprising in series a grinding facility, means for flotation to remove off-colored particles, centrifugal classification means, thickening means, drying means, pulverizing means, air classification means and collecting means.

References Cited

UNITED STATES PATENTS

| | | | |
|---|---|---|---|
| 1,954,211 | 4/1934 | Kuntz | 241—24 |
| 2,595,117 | 4/1952 | Ahlmann | 241—24 |

GERALD A. DOST, Primary Examiner

U.S. Cl. X.R.

241—80, 97